July 3, 1951  M. J. THOMAS  2,558,799
ROTARY VEGETABLE JUICE EXTRACTOR
HAVING SEPARATING MEANS Filed May 7, 1946  3 Sheets-Sheet 1

*INVENTOR.*

MATTHEW J. THOMAS,

BY *Victor J. Evans & Co.*

ATTORNEYS

*INVENTOR.*
MATTHEW J. THOMAS
BY *Victor J. Evans & Co.*
ATTORNEYS

*INVENTOR.*

MATTHEW J. THOMAS,

Patented July 3, 1951

2,558,799

UNITED STATES PATENT OFFICE 2,558,799

ROTARY VEGETABLE JUICE EXTRACTOR HAVING SEPARATING MEANS

Matthew J. Thomas, Los Angeles, Calif.

Application May 7, 1946, Serial No. 667,863

1 Claim. (Cl. 146—76)

My present invention relates to an improved rotary vegetable juice extractor having separating means and more particularly to the rotary type of extractor wherein the vegetable pulp is first macerated and then the macerated pulp and juice are separated and delivered out of separate outlets into suitable receptacles.

The extractor of the present invention is an improvement over the prior patent issued to me No. 2,315,028 but presents certain novel features not shown or described in the prior patent.

The present disclosure relates primarily to the macerating rotor and the housing sections, and the means incorporated therein to pass the macerated pulp at intervals into the feed, whereupon the feed passes the pulp into a whipper and juice extractor.

In the accompanying drawings I have illustrated one complete example of the physical embodiment of my invention according to the best mode I have thus far devised but it will be understood that various changes and alterations may be made in the exemplified structure within the scope of the appended claim.

Figure 1:
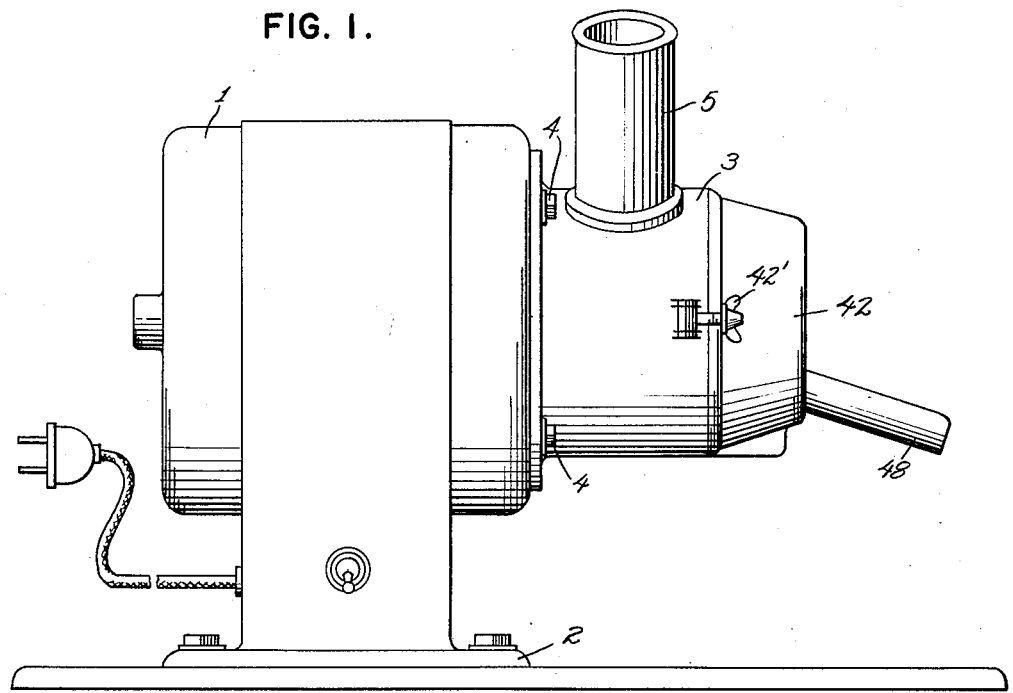
Figure 1 is a side elevational view of the extrator of my invention.
Figure 2:
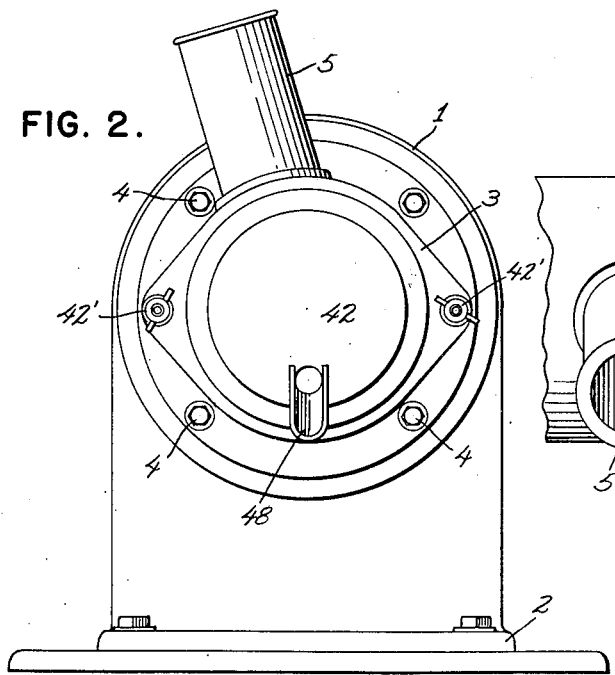
Figure 2 is an end elevational view thereof.
Figure 3:
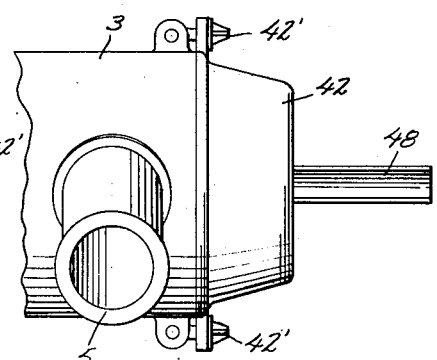
Figure 3 is a partial top plan view.

Referring now to the drawings, I employ a conventional electric motor as 1 having a base 2, and the macerator housing 3 is secured to the motor as by bolts 4. A vegetable feed 5 is shown in the upper part of the macerator housing for the introduction of chopped or diced vegetables to the macerator.

The driving axle 6 of the motor 1 extends through the partition 7 which forms the confining wall for the macerator assembly.

The macerator comprises three elements, the two semi-cylindrical casing sections, and the interior rotor, and when assembled and in position within the housing the macerator breaks down the structure of the chopped or diced vegetables and feeds them to the whipper for the removal of the juices contained therein.

The lower section 8 of the macerator is as stated, semi-cylindrical in shape and is fashioned with end walls 9 and 10. The longitudinally extending flanges 11 and 12 along the sides of the section are tapered downwardly as at 11' and 12'. The end wall 9 is formed with an opening 13 therein and the upper edge of the end wall 9 is formed with semi-circular notches 14 and 15.

The end wall 10 is fashioned with an axle opening 16, and the semi-cylindrical section is formed with interior transverse grooves 17 forming ridges therebetween as 18. The interior grooved and ridged surface of the section is also formed with a longitudinally extending passage formed by notching the ridges as at 19.

The outer ends of the ridges are tapered downwardly as at 20.

The upper section of the macerator is also semi-cylindrical in shape and is illustrated at 21 having end walls 22 and 23 and side flanges 24 and 25 tapered respectively at 24' and 25'.

The lower edge of the end wall 22 is fashioned with semi-circular notches 26 and 27 for co-action with the notches 14 and 15 of the lower section to form circular openings through the end of the housing.

The upper section of the macerator housing is also formed with interior transverse grooves 29 forming ridges 30 therebetween and the outer edges of the ridges are tapered at 31 to co-act with the tapered ends 20 of the lower section to form passages. An opening central of the section shown at 32 permits the ingress of the chopped or diced vegetables from which the juice is to be extracted.

The two semi-cylindrical sections of the macerator housing are designed for co-operative action to house the macerator rotor 33 which is formed with exterior lugs 34 having grooves 35 which lugs and grooves are closely associated with the interior grooves of the housing. A small clearance therebetween permits the passage of the vegetables while being macerated.

The cylindrical rotor 33 has end walls 37 and 38 and the latter wall has an opening 39 for the axle 6. The wall 37 is fashioned with an axle opening 40 with notches 41 therein whereby the rotor may be keyed to the axle for rotation therewith.

Designed to be secured to the macerator housing 3 is the extractor housing 42 secured by wing nuts 42' having a pulp outlet chute 48 and formed with an annular end groove 44 adapted to fit inside the edge of the housing 3.

The extractor housing is fashioned with interior annular flanges 45 and 45' to support a cylindrical perforated screen 46 and having rings 47 and helical braces 47'. A juice outlet 43 is provided under the screen.

Figure 4:
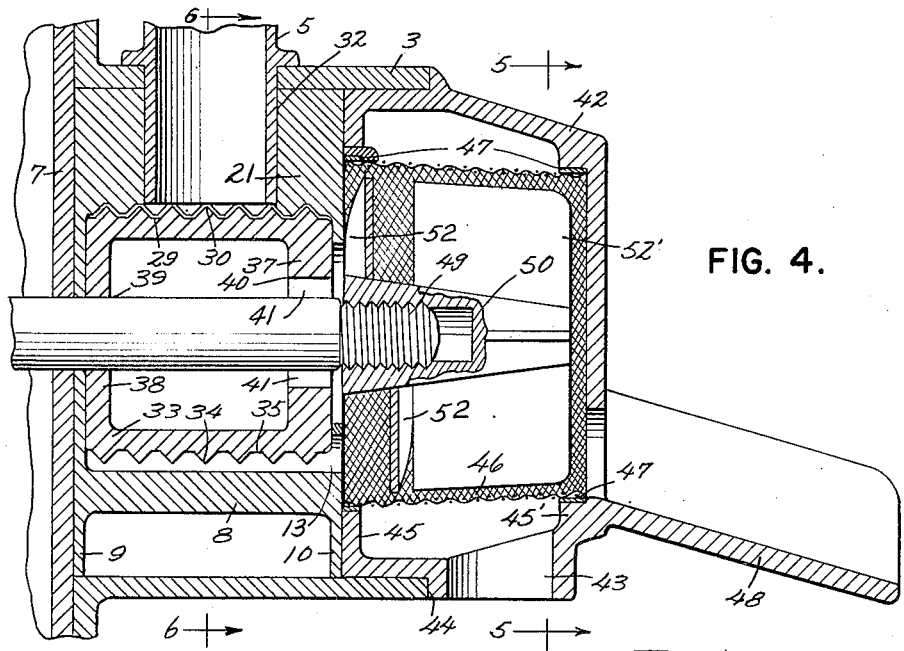
Figure 4 is a vertical sectional view showing the macerator and whipper.
Figure 5:
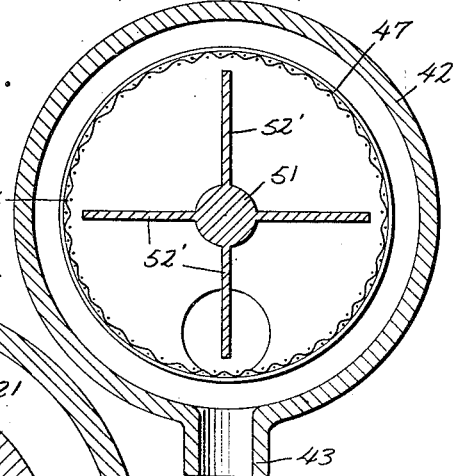
Figure 5 is a vertical sectional view taken along line 5—5 of Figure 4.
Figure 6:
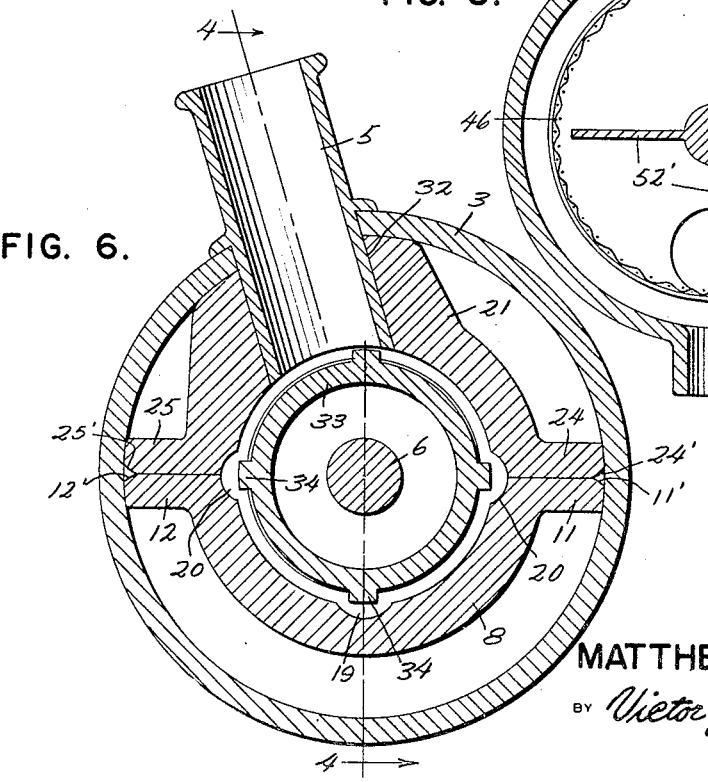
Figure 6 is a vertical sectional view taken along line 6—6 of Figure 4.
Figure 7:
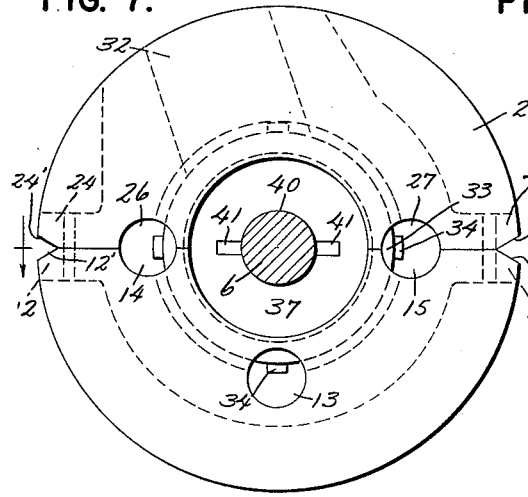
Figure 7 is an end elevational view of the macerator.
Figure 8:
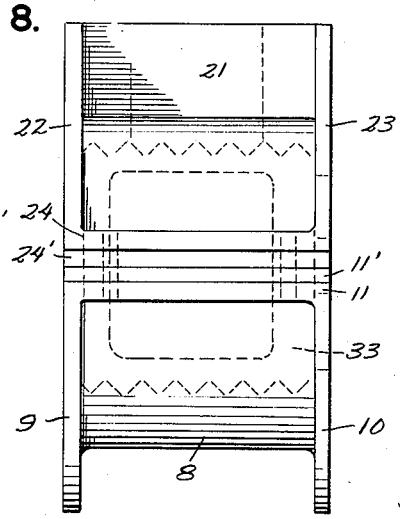
Figure 8 is an end elevational view thereof.
Figure 9:
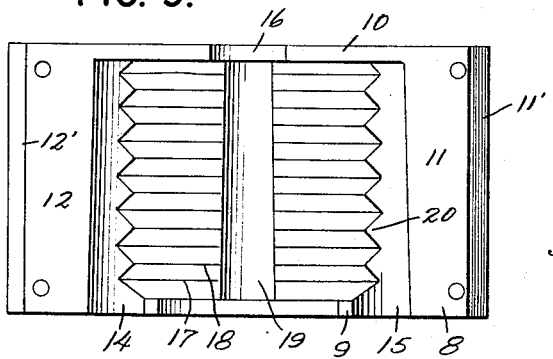
Figure 9 is a top plan view of one macerator section.
Figure 10:
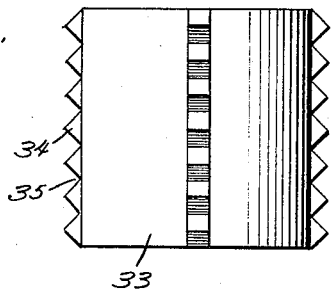
Figure 10 is a side elevational view of the rotor.
Figure 11:
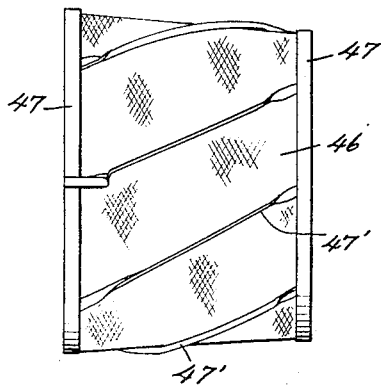
Figure 11 is a side elevational view of the screen.
Figure 12:
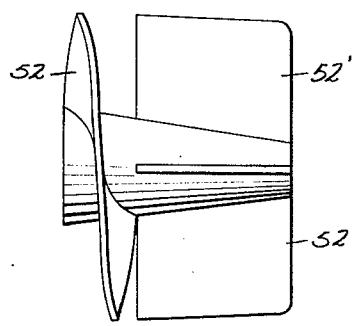
Figure 12 is a side elevational view of the whipper and feed.

Adapted for rotation within the screen is the whipper threadedly mounted upon the axle end 49. The whipper, as illustrated in Figures 4, 5 and 12 of the drawings comprises a core 51 having a helical worm feed 52 and radially extending bats or wings 52' forming the whipper.

In operation, the chopped or diced vegetables are placed in the feed 5, and the rotor in its rotation cuts and macerates the matter between the rotor and the housing sections. As the matter is cut and macerated it is passed through the passages formed through the longitudinal series of notches 19 to the opening 13; through the passage formed by the tapered ends 20 of the ridges, to opening 14—27; and through the passage formed by the tapered ends 20 to the opening 15—26.

The macerated matter is allowed to pass through the openings in the end sections 8—21 only when the end of the helical feed 52 uncovers the respective openings. Thus fixed amounts of the macerated matter are permitted to emerge at a time just before the feed is ready to pass it into the extractor.

The helical feed therefore moves the material periodically into the interior of the perforated screen and the whipper blades or wings agitate and beat the material to extract the juice therefrom.

The juice passes through the perforations of the screen and out through the port 43, while the juiced pulp passes out through the chute 48.

It should be apparent that there is no substantial pressure forcing the macerated matter through the screen. This is not desirable nor suitable. The feed moving the matter in limited quantities into the screen obviates the possibility so that the matter is whipped or beaten within the screen, but no matter is forced therethrough except the juice.

Having thus fully described my invention what I claim as new and desire to secure by Letters Patent is:

In a juice extractor having a macerator housing provided with longitudinally extending passages therein, the improvement comprising an axle extending through said housing having a macerator rotor thereon, a whipper and feed secured to said axle outwardly of said housing, said whipper and feed comprising a conical shaped core, radially extending wings on said core adjacent one end thereof, a helical worm feed on said core adjacent the other end thereof, a second housing for said whipper and feed carried by said first housing and concentric with said whipper and feed, a cylindrical screen in said second housing concentric with said whipper and feed and slightly spaced from the outer ends and edges of said wings, a juice outlet and pulp outlet for said second housing and the passages of said first housing communicating with said second housing to permit the passage of macerated material from said first housing to said second housing to be acted upon by said whipper and feed.

MATTHEW J. THOMAS.

REFERENCES CITED

The following references are of record in the file of this patent:

UNITED STATES PATENTS

| Number | Name | Date |
|---|---|---|
| 483,899 | Cantwell | Oct. 4, 1892 |
| 1,433,523 | Babcock | Oct. 31, 1922 |
| 1,718,893 | Brown, Jr. | June 25, 1929 |
| 1,811,740 | Asbury | June 23, 1931 |
| 1,989,231 | Gilliatt | Jan. 29, 1935 |
| 2,142,480 | Satzinger | Jan. 3, 1939 |
| 2,172,790 | Ferrari et al. | Sept. 12, 1939 |
| 2,267,048 | Schwarz | Dec. 23, 1941 |
| 2,315,028 | Thomas | Mar. 30, 1943 |
| 2,325,006 | Crawford | July 20, 1943 |
| 2,345,683 | Owens | Apr. 4, 1944 |